3,278,563
1-PHENOXY- AND 1-PHENYLTHIO-ANILINO-4-
HYDROXY-ANTHRAQUINONE DYES
Peter Hindermann, Basel, Hans Peter Kolliker, Munchenstein, Basel-Land, and Alfred Staub, Binningen, near Basel, Switzerland, assignors to J. R. Geigy, A.-G., Basel, Switzerland
No Drawing. Original application Apr. 22, 1963, Ser. No. 274,779, now Patent No. 3,214,445, dated Oct. 26, 1965. Divided and this application May 25, 1965, Ser. No. 473,259
Claims priority, application Switzerland, Apr. 26, 1962, 5,026/62; July 24, 1962, 8,908/62
7 Claims. (Cl. 260—380)

This application is a division of our copending application, Serial No. 274,779, filed April 22, 1963.

The present invention concerns substituted dihydroxy-phenylamino-anthraquinones, processes for the production thereof, dyeing processes using these new anthraquinone dyestuffs, as well as, as industrial product, the material fast-dyed with the aid of these dyestuffs.

The known 1-phenylamino-4-hydroxy-anthraquinone dyestuffs which have been used in the dyeing of acetate rayon are often not satisfactory for the dyeing of polyester fibers because of their inferior drawing power on the latter fibers, and the lack of fastness to light and to sublimation of the resulting colored fibers.

It is, therefore, an important object of the invention to provide 1-phenylamino-4-hydroxy-anthraquinone dyes which draw well especially on polyester fibers and afford colored materials which are distinguished by good fastness, particularly to sublimation.

It has been found that valuable, difficulty water-soluble dihydroxy-phenylamino-anthraquinones of formula

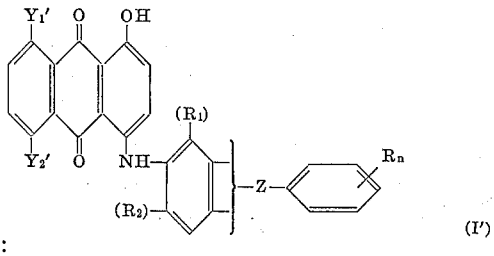

(I')

wherein:

One of $Y_1'$ and $Y_2'$ represents the hydroxyl group and the other represents the nitro group,
Z represents oxygen or sulfur,
Each of $R_1$ and $R_2$ represents a lower alkyl group, especially methyl or ethyl, or hydrogen,
R represents hydrogen, chlorine, bromine or lower alkyl, and
n represents a positive integer of at most 4, are obtained if a dihydroxydinitro anthraquinone of formula

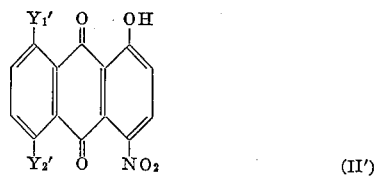

(II')

wherein $Y_1'$ and $Y_2'$ have the meanings given in Formula I', is reacted with an amine of Formula III'

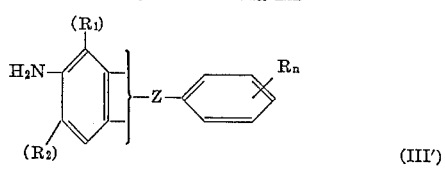

(III')

wherein Z, R, $R_1$, $R_2$ and n have the meanings given in Formula I' and the product obtained, if desired, is after-halogenated.

When R is a lower alkyl group it is preferably the methyl group but it can also be an ethyl group; if R is halogen then it is, for example, chloride or bromine.

Because of their easy accessibility, dyestuffs of Formula I' in which n is 1 or 2 and Z is oxygen are preferred.

Dihydroxydinitro anthraquinones of Formula II' used according to the invention as starting materials can belong to the 1,5-dihydroxy anthraquinone series (anthrarufin) or the 1,8-dihydroxy anthraquinone series (chrysazin); often mixtures of these isomers can also be used with advantage in the process according to the invention.

Examples of amines of Formula III' to be reacted according to the invention are: 3-amino-diphenyl ether or thioether, 4-amino-diphenyl ether or thioether, 3-amino-2'-methyl- or 2'-ethyl-diphenyl ether or thioether, 3-amino-3'-methyl- or 3'-ethyl-diphenyl ether or thioether, 3-amino-4'-methyl- or 4'-ethyl-diphenyl ether or thioether, 4-amino-2'-methyl- or 2'-ethyl-diphenyl ether or thioether, 4-amino-3'-methyl- or 3'-ethyl-diphenyl ether or thioether, 4-amino-4'-methyl- or 4'-ethyl-diphenyl ether or thioether, 3-amino-2'-chloro- or 2'-bromo-diphenyl ether or thioether, 3-amino-3'-chloro- or 3'-bromo-diphenyl ether or thioether, 3-amino-4'-chloro- or 4'-bromo-diphenyl ether or thioether, 4-amino-2'-chloro- or 2'-bromo-diphenyl ether or thioether, 4-amino-3'-chloro- or 3'-bromo-diphenyl ether or thioether, 4-amino-4'-chloro- or 4'-bromo-diphenyl ether or thioether, 3-amino- 3',5'-dimethyl-diphenyl ether or thioether, 4-amino- 3',5'-dimethyl-diphenyl ether or thioether, 4-amino-3'-chloro-4'-methyl-diphenyl ether or thioether, 4-amino-3,5-dimethyl-diphenyl ether or thioether, 4-amino-3,5,4'-trimethyl-diphenyl ether or thioether, 3-amino-2,4-dimethyl-diphenyl ether or thioether, 4-amino-2,3,5,6-tetramethyl-diphenyl ether or thioether, 4-amino-3,5-diethyl-diphenyl ether or thioether or 4-amino-3-methyl-5-ethyl-diphenyl ether or thioether.

Because of their greater stability under the reaction conditions, the aminodiphenyl oxygen ethers are preferred to the corresponding thioethers.

These amines are obtained, for example, by condensation of a p-nitro-halogen benzene which can also contain lower alkyl groups, with unsubstituted or an alkyl- and/or halogen-substituted hydroxy- or mercapto-benzene to form the corresponding nitrodiphenyl ether or thioether followed by reduction of the nitro group to the amino group; they are also obtained by condensation of an m-bromoaniline with a hydroxy- or mercapto-benzene of the type mentioned above in the presence of copper.

The reaction of the reaction partners to form compounds of the Formula I' is performed in an excess of amine in the melt at 100–200° C., advantageously however, in an inert organic solvent boiling at 120 to 200° C., e.g. in butanol, glycol monoethyl ether, dimethyl formamide or, especially, in a preferably substituted hydrocarbon such as chlorobenzene, dichlorobenzene and, in particular, nitrobenzene.

When the new dihydroxyphenylamino anthraquinones are to be after-halogenated, this is performed advantageously with elementary chlorine or bromine or with sulfuryl chloride in a solvent which is inert to halogen such as nitrobenzene or chloroform or also in sulfuric acid.

The new dihydroxyphenylamino anthraquinones of Formula I' generally crystallize out of the reaction mixture. They are obtained by filtration, dilution of the mixture with water or a lower alkanol or by removal of the organic solvent by distillation or steam distillation and they can be purified by recrystallization.

In the pure state, the new dyestuffs of Formula I' are bronzy, crystalline, deeply colored compounds. They dissolve in hot organic solvents with a pure blue color.

Fibers made from polymeric esters of aromatic polycarboxylic acids and polyvalent alcohols which can be dyed according to the invention are, e.g.: "Terylene" of Imperial Chemical Industries, Manchester; "Dacron" of E. I. du Pont de Nemours & Co., Wilmington, Delaware, U.S.A.; "Tergal" of Rhodiaceta, Lyons; "Trevira" of Farbwerke Hoechst, Frankfurt am Main; "Terital" of Rhodiatoce, Milan; or "Kodel" of Eastman Chemical Products, Inc., Kingsport, Tenn., U.S.A.

Fibers made from polymeric esters of aromatic polycarboxylic acids and polyvalent alcohols are dyed with the aqeous dispersions of dyestuffs according to the invention advantageously at temperatures of over 100° under pressure. Very good dyeings are also obtained if these fibers are impregnated with concentrated aqueous dispersion of dyestuffs according to the invention, the wrung out goods are dried and then the dying is fixed at temperatures of 180–250°. Dyeing can also be performed, however, at the boiling point of the dyebath in the presence of carriers such as phenylphenol, polychlorobenzene compounds or similar auxiliaries.

The drawing power of the dyestuffs can be further improved by mixing two or more anthraquinone dyestuffs according to the invention. Compared with dyeings made with previously known dyestuffs of similar constitution, the blue dyeings attained on the fibers mentioned with the dyestuffs according to the invention have considerably improved fastness to sublimation and light and very good wet fastness properties.

The following examples illustrate the invention. Where not otherwise expressly stated, parts are given as parts by weight. The temperatures are in degrees centigrade. The relationship of parts by weight to parts by volume is as that of grams to cubic centimeters.

*Example 1*

33 parts of 1,5-dihydroxy-4,8-dinitro-anthraquinone and 46.25 parts of 4-aminodiphenyl ether are heated for 5 hours at 120–125° in 500 parts of 2-ethoxyethanol, during which time the solution gradually turns a deep dark blue color. On cooling the solution, the dyestuff formed of the formula

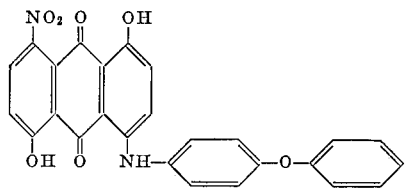

precipitates in the form of fine violet blue tiny crystals; it is filtered off and dried. After recrystallisation from 2-ethoxyethanol, the product melts at 239–240°; it dissolves on warming in concentrated sulfuric acid with a yellow-green color and in pyridine or a mixture of xylenes with a blue color.

The finely distributed dyestuff dyes polyester fibers from an aqueous dispersion in very fast, clear, blue shades. If, instead of the 46.25 parts of 4-aminodiphenyl ether, the same number of parts of 3-aminodiphenyl ether are heated for 18 hours at the temperature given, then a somewhat reddish blue dyestuff is obtained which has similarly good fastness properties.

*Example 2*

Example 1 is repeated, but instead of 33 parts of 1,5-dihydroxy-4,8-dinitro-anthraquinone there are used 33 parts of 1,8-dihydroxy-4,5-dinitro-anthraquinone and instead of the 46.25 parts of 4-aminodiphenyl ether there are used 50.25 parts of 3-aminodiphenyl thioether, all the other conditions remaining identical. The resulting dyestuff has similarly good fastness properties as those described in Example 1.

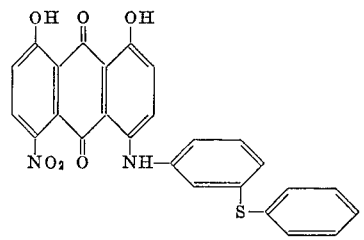

*Example 3*

First 33 parts of 1,8-dihydroxy-4,5-dinitro-anthraquinone and then 40.7 parts of 3-aminodiphenyl ether are added at room temperature to 400 parts of distilled nitrobenzene. The mixture is heated for 30 minutes at 180–185° while stirring well and simultaneously a stream of nitrogen is directed over the surface of the solution. At this temperature, the solution turns deep blue within 3 hours. The solution is cooled to 50°, and 3000 parts of methanol are added. The dyestuff precipitates almost quantitatively out as a very fine dark powder of the formula

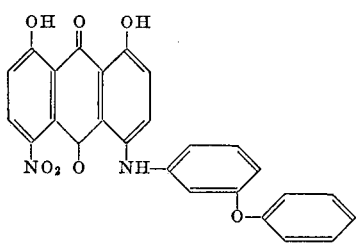

This is filtered off and recrystallised from 2-ethoxyethanol. Violet crystals which melt at 206–207° are obtained. They dissolve in concentrated sulphuric acid with a brownish yellow, in pyridine and a mixture of xylene with a blue colour.

The dyestuff dyes fabric made from polyester fibers from an aqueous dispersion in clear, blue shades which have excellent fastness to light, wet and sublimation.

A very similar somewhat more greenish dyestuff is obtained on using 40.7 parts of 4-aminodiphenyl ether instead of the same number of parts of 3-aminodiphenyl ether.

*Example 4*

50.25 parts of 4-aminodiphenyl thioether are added to a paste of 33 parts of 1,5-dihydroxy-4,8-dinitro-anthraquinone in 350 parts of nitrobenzene and the mixture is heated at 180 to 185° until no more starting material can be traced. After removing the solvent by steam distillation, the condensation product of the formula

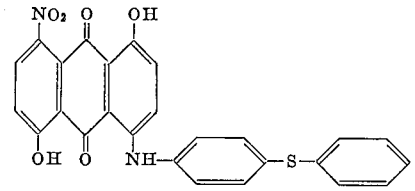

is obtained from the deep blue solution obtained. It is filtered off, dried and recrystallised from pyridine. In this way, very fine blue small crystals are obtained which melt at 209–210°. It dissolves in concentrated sulphuric acid with a dark green, in pyridine and in a technical xylene mixture with a blue colour.

The dyestuff dyes polyester material from a finely distributed aqueous dispersion in greenish blue shades which have very good fasteners to wet, sublimation and light.

If instead of the 33 parts of 1,5-dihydroxy-4,8-dinitro-anthraquinone, the same number of parts of 1,8-dihydroxy-4,5-dinitro-antraquinone is used, then a very similar but somewhat more greenish blue dyestuff having the same excellent fastness properties is obtained.

Example 5

A mixture of 16.5 parts of 1,5-dihydroxy-4,8-dinitro-anthraquinone and 16.5 parts of 1,8-dihydroxy-4,5-dinitro-anthraquinone is heated to 180–185° with 50.8 parts of 4-amino-4'-methyldiphenyl ether in 350 parts of nitrobenzene. After 1½ hours, the mixture of the dyestuffs formed of the formulae

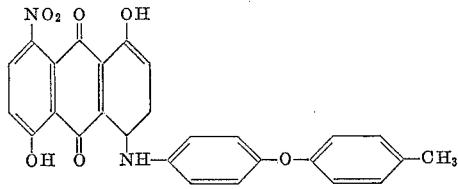

and

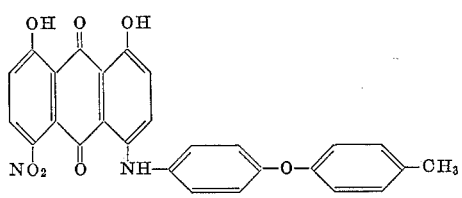

is precipitated by stirring the deep blue solution into 800 parts of ice-cooled methanol. The precipitate is filtered off, adhering nitrobenzene is removed by washing with hot methanol and it is then dried.

The dyestuff dissolves in concentrated sulphuric acid with a greenish yellow, in pyridine and in a mixture of xylenes with a blue colour. The dyestuff dyes polyester fibres from a fine aqueous dispersion in deep blue shades and the dyeings have excellent fastness properties.

A considerably more greenish dyestuff is obtained if 54.83 parts of 4-amino-4'-methyldiphenyl thioether are used instead of 50.8 parts of 4-amino-4'-methyldiphenyl ether, and a somewhat more reddish dyestuff is obtained by replacing the 50.8 parts of 4-amino-4'-methyldiphenyl ether by 47.18 parts of 3-aminodiphenyl ether.

Example 6

33 parts of 1,5-dihydroxy-4,8-dinitro-anthraquinone are mixed with 53.25 parts of 4-amino-3,5-dimethyldiphenyl ether. This mixture is added within 10 minutes in small portions to 350 parts of 180° hot nitrobenzene. The solution is then stirred well for 20 hours at this temperature under an atmosphere of nitrogen in a vessel fitted with a sloping condenser, whereupon it turns an intensive blue colour. On distilling off the main amount of solvent under vacuum and rubbing the distillation residue with methanol, the condensation product of the constitution

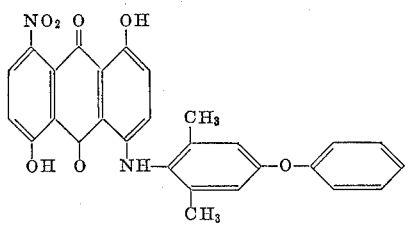

is obtained as a fine dark blue-violet powder. By repeated recrystallisation from 2-ethoxyethanol, the dyestuff is obtained in pure form as violet crystals which melt at 251–252°. It dissolves in concentrated sulphuric acid with a blue, in pyridine and in a technical xylene mixture with a reddish blue colour. From an aqueous dispersion, the dyestuff dyes polyester fibres in intensive reddish blue shades. The dyeings have excellent fastness to light, sublimation and water.

Very similar shades of the same excellent fastness are obtained by using 56.75 parts of 4-amino-3,5,4'-trimethyl-diphenyl ether, 60.25 parts of 4-amino-2,3,5,6-tetramethyl-diphenyl ether, 57.25 parts of 4-amino-3,5-dimethyldiphenyl thioether, 53.25 parts of 3-amino-2,4-dimethyldiphenyl ether, or 58.25 parts of 4-amino-3,5-diethyldiphenyl ether instead of the 53.25 parts of 4-amino-3,5-dimethyl-diphenyl ether. On the other hand, if in all cases the 33 parts of 1,5-dihydroxy-4,8-dinitro-anthraquinone are replaced by the same number of parts of 1,8-dihydroxy-4,5-dinitro-anthraquinone, then somewhat less strong reddish blue shades having the same good fastness properties are obtained.

Example 7

66 parts of 1,5-dihydroxy-4,8-dinitro-anthraquinone and 96.5 parts of 4-amino-4'-chlorodiphenyl ether in 400 parts of nitrobenzene are heated for 1 hour at 185–190° in a weak stream of nitrogen, about 5 parts of water being distilled off through a sloping condenser. A blue solution is formed. On cooling, the product of the formula

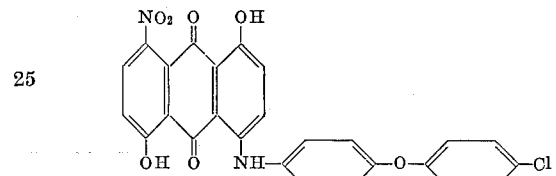

crystallises out. A further amount of the product mentioned can be isolated by concentrating the mother lye. Its melting point, after recrystallisation once from nitrobenzene is 265–267°.

It is a shimmering crystal powder which dissolves in pyridine or in xylene with a blue and in concentrated sulphuric acid with a green colour.

From a fine aqueous distribution with the addition of o-phenylphenol and a fatty alcohol polyethylene condensation product, the dyestuff dyes "Dacron" (of E. I. du Pont de Nemours) in reddish blue shades which have good fastness to light and excellent fastness to sublimation.

If in the above example, the 96.5 parts of 4-amino-4'-chlorodiphenyl ether are replaced by the same amount of 4-amino-2'-chlorodiphenyl ether or by 117 parts of 4-amino-3'-methyl-4'-chlorodiphenyl ether, then dyestuffs having the same properties are obtained.

Example 8

46.8 parts of the dyestuff produced according to Example 1 of the formula

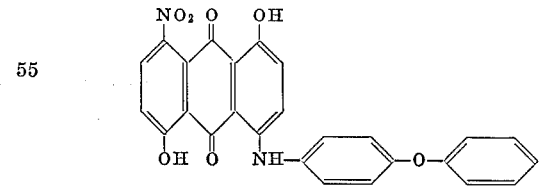

are dissolved hot in 200 parts of abs. nitrobenzene. The solution is cooled to 20–25° and then a solution of 16 parts of bromine in 40 parts of abs. nitrobenzene is added dropwise within 1 hour. The whole is stirred for another 15 hours at 20–25° whereupon the dyestuff monobrominated in the diphenyl ether group gradually precipitates. The precipitation is completed by diluting the mixture with methanol. The new dyestuff dyes polyester fibres from an aqueous dispersion in somewhat more reddish blue shades than the unbrominated dyestuff. The dyeings have excellent fastness to sublimation.

A dyestuff monohalogenated in the diphenyl ether group having the same properties is obtained starting from the condensation product of 1,5-dihydroxy-4,8-dinitro-anthraquinone and 4-amino-3'-methyldiphenyl ether, by afterbrominating this condensation product or also after-chlorinating in an analogous manner by introducing chlorine into the nitrobenzene solution.

Example 9

2 parts of the finely ground dyestuff obtained according to Example 1 are dispersed in 4000 parts of water. 12 parts of the sodium salt of o-phenylphenol and 12 parts of diammonium phosphate are added to this fine distribution and 100 parts of terephthalic acid polyglycol ester fabric are dyed for 1½ hours at 95–98°. The dyeing is rinsed and thoroughly washed with dilute sodium hydroxide solution and a dispersing agent such as, e.g. the condensation product of naphthalene sulphonic acid and formaldehyde. A blue dyeing which is fast to light, wet and sublimation is obtained.

Example 10

2 parts of the finely ground dyestuff mixture obtained according to Example 4 are distributed in 4000 parts of water which contain 2 parts of a condensation product of naphthalene sulphonic acids and formaldehyde. The pH of the dyebath is adjusted to 6.5 with acetic acid. 100 parts of terephthalic acid polyglycol ester fabric are introduced at 40°, the bath is heated within 15 minutes to 120° in an autoclave and kept for 45 minutes at this temperature. The dyeing is rinsed with water and then soaped. A clear blue dyeing is obtained which has excellent fastness to light, wet and sublimation.

The following table gives the shades of dyeings on "Dacron" obtained with other dyestuffs which can be produced by methods analogous to those described in the foregoing examples.

TABLE I

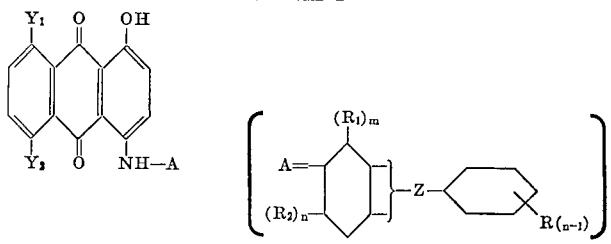

| No. | $Y_1$ | $Y_2$ | —NH—A | Shade on Dacron |
|---|---|---|---|---|
| 1 | $NO_2$ | OH | —NH—⟨ ⟩—O—⟨ ⟩—$CH_3$ | Blue. |
| 2 | OH | $NO_2$ | —NH—⟨ ⟩—O—⟨ ⟩—$CH_3$ | Do. |
| 3 | $NO_2$ | OH | —NH—⟨ ⟩—O—⟨ ⟩—$CH_3$ | Do. |
| 4 | $NO_2$ | OH | —NH—⟨$CH_3$, $C_2H_5$⟩—O—⟨ ⟩—$CH_3$ | Reddish blue. |
| 5 | $NO_2$ | OH | —NH—⟨ ⟩—O—⟨$CH_3$, $CH_3$⟩ | Blue. |
| 6 | OH | $NO_2$ | —NH—⟨ ⟩—S—⟨ ⟩—$CH_3$ | Do. |
| 7 | OH | $NO_2$ | —NH—⟨$CH_3$, $CH_3$⟩—O—⟨$CH_3$, $CH_3$⟩ | Reddish blue. |
| 8 | $NO_2$ | OH | —NH—⟨ ⟩—O—⟨ ⟩—$C_2H_5$ | Blue. |
| 9 | OH | $NO_2$ | —NH—⟨ ⟩—O—⟨ ⟩—Cl | Do. |
| 10 | $NO_2$ / OH | OH / $NO_2$ | —NH—⟨ ⟩—O—⟨ ⟩—$CH_3$ | Do. |
| 11 | OH | $NO_2$ | —NH—⟨ ⟩—S—⟨ ⟩—$C_2H_5$ | Do. |

TABLE I.—Continued
| No. | Y₁ | Y₂ | —NH—A | Shade on Dacron |
|---|---|---|---|---|
| 2 | NO₂ | OH |  | Blue. |
| 13 | NO₂ | OH |  | Do. |
| 14 | NO₂ | OH |  | Do. |
| 15 | OH | NO₂ |  | Do. |
| 16 | NO₂ | OH |  | Do. |
| 17 | OH | NO₂ |  | Do. |
| 18 | NO₂ | OH |  | Reddish blue. |
| 19 | OH | NO₂ |  | Blue. |
| 20 | NO₂ | OH |  | Do. |
| 21 | OH | NO₂ |  | Do. |
| 22 | OH | NO₂ |  | Do. |
| 23 | OH | NO₂ |  | Reddish blue. |
| 24 | NO₂ | OH |  | Blue. |
| 25 | OH | NO₂ |  | Do. |
| 26 | NO₂ | OH |  | Do. |
| 27 | OH | NO₂ |  | Do. |

TABLE I.—Continued

| No. | $Y_1$ | $Y_2$ | —NH—A | Shade on Dacron |
|---|---|---|---|---|
| 28 | $NO_2$ | OH | 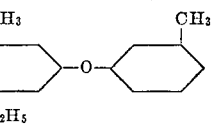 | Reddish blue. |
| 29 | $NO_2$ | OH | 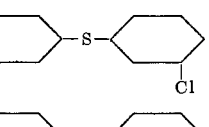 | Blue. |
| 30 | OH | $NO_2$ | 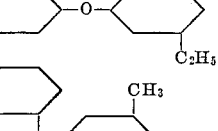 | Do. |
| 31 | $NO_2$ | OH | 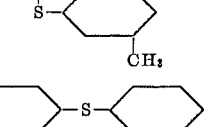 | Do. |
| 32 | $NO_2$ | OH | 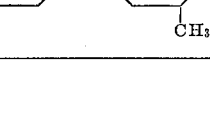 | Do. |

What we claim is:

1. A dyestuff of the formula

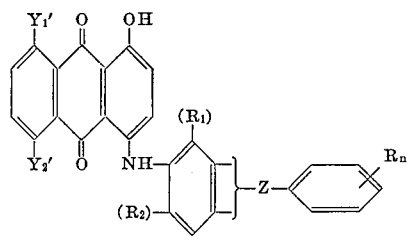

wherein:

One of $Y_1'$ and $Y_2'$ is a hydroxyl group and the other is the nitro group,

Z represents a member selected from the group consisting of oxygen and sulfur, each of $R_1$ and $R_2$ represents a member selected from the group consisting of hydrogen and lower alkyl, R is a member selected from the group consisting of hydrogen, lower alkyl, chlorine and bromine, and $n$ represents a positive whole number of at most 2.

2. A dyestuff of the formula

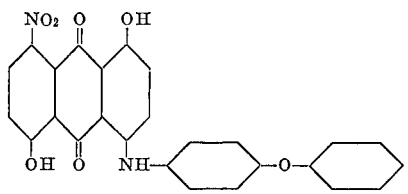

3. A dyestuff of the formula

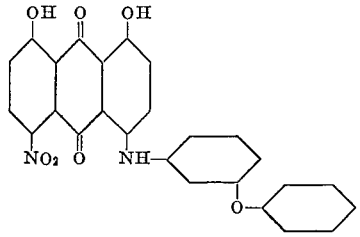

4. A dyestuff of the formula

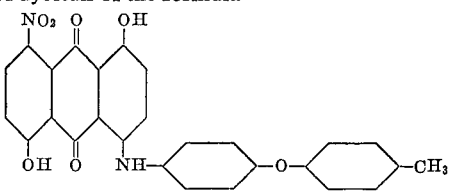

5. A dyestuff of the formula

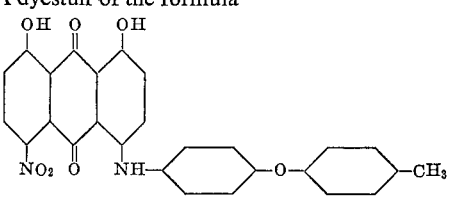

6. A dyestuff of the formula

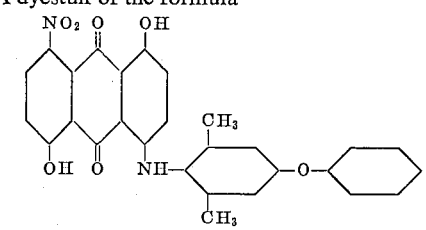

7. A dyestuff of the formula

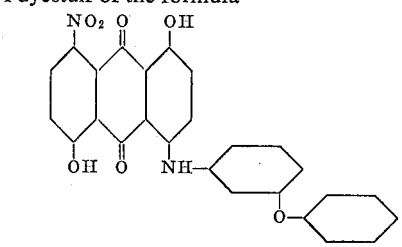

References Cited by the Examiner

UNITED STATES PATENTS 2,845,443   7/1958   Hindermann et al. __ 260—380 X

LORRAINE A. WEINBERGER, *Primary Examiner.*

H. C. WEGNER, *Assistant Examiner.*